(12) United States Patent
Kusznierewicz

(10) Patent No.: US 11,009,073 B2
(45) Date of Patent: May 18, 2021

(54) ROLLING BEARING

(71) Applicants: Zbigniew Kusznierewicz, Warsaw (PL); Mateusz Kusznierewicz, Warsaw (PL)

(72) Inventor: Zbigniew Kusznierewicz, Warsaw (PL)

(73) Assignees: Zbigniew Kusznierewicz, Warsaw (PL); Mateusz Kusznierewicz, Warsaw (PL)

(*) Notice: Subject to any disclaimer, the term of this patent is extended or adjusted under 35 U.S.C. 154(b) by 0 days.

(21) Appl. No.: 16/837,632

(22) Filed: Apr. 1, 2020

(65) Prior Publication Data

US 2020/0224720 A1    Jul. 16, 2020

Related U.S. Application Data

(63) Continuation of application No. PCT/PL2018/000067, filed on Jul. 4, 2018.

(30) Foreign Application Priority Data

Nov. 16, 2017    (PL) .......................................... 423481

(51) Int. Cl.
*F16C 33/38*    (2006.01)
*F16C 33/58*    (2006.01)
(Continued)

(52) U.S. Cl.
CPC .......... *F16C 33/3887* (2013.01); *F16C 33/32* (2013.01); *F16C 33/38* (2013.01);
(Continued)

(58) Field of Classification Search
CPC .... F16C 19/163; F16C 33/38; F16C 33/3837; F16C 33/3843; F16C 33/385;
(Continued)

(56) References Cited

U.S. PATENT DOCUMENTS

| | | | |
|---|---|---|---|
| 1,334,027 A | | 3/1920 | Forsberg |
| 3,429,626 A | * | 2/1969 | Teufel ................. F16C 33/4623 384/572 |

(Continued)

FOREIGN PATENT DOCUMENTS

| | | |
|---|---|---|
| EP | 0 375 938 A1 | 7/1990 |
| JP | H7-197937 A | 8/1995 |

(Continued)

OTHER PUBLICATIONS

International Search Report issued for corresponding International Patent Application No. PCT/PL2018/000067 dated Nov. 14, 2018.

*Primary Examiner* — Alan B Waits
(74) *Attorney, Agent, or Firm* — Myers Wolin, LLC

(57) ABSTRACT

A rolling bearing, wherein the rolling elements are loaded, equipped with a cage separating the rolling elements, wherein at least one groove is situated on the bearing race on which the rolling elements travel, wherein edges of the groove are positioned at an angle α from 4.5° to 80° in relation to the movement direction of the rolling elements, and in the cage, holes for the rolling elements are made askew so that the angle β between a straight line connecting the cage centre with the centre of the hole for the rolling element and a tangent to the rolling element in the contact point of this element with the cage has a value β>arc tg μ, where μ is the sliding friction coefficient of mating of the rolling element material with the cage material.

4 Claims, 7 Drawing Sheets

(51) Int. Cl.
    *F16C 33/32*    (2006.01)
    *F16C 19/16*    (2006.01)
(52) U.S. Cl.
    CPC .......... *F16C 33/3843* (2013.01); *F16C 33/58* (2013.01); *F16C 33/585* (2013.01); *F16C 19/163* (2013.01)
(58) Field of Classification Search
    CPC .. F16C 33/3856; F16C 33/3887; F16C 33/58; F16C 33/583; F16C 33/585; F16C 33/32
    See application file for complete search history.

(56) References Cited

U.S. PATENT DOCUMENTS

| | | | | |
|---|---|---|---|---|
| 3,918,778 | A * | 11/1975 | Jacobson | F16C 19/163 384/447 |
| 2008/0285903 | A1 | 11/2008 | Olsen | |
| 2014/0056547 | A1* | 2/2014 | Murata | F16C 33/6681 384/101 |
| 2014/0348456 | A1* | 11/2014 | Frank | F16C 33/64 384/494 |

FOREIGN PATENT DOCUMENTS

| | | |
|---|---|---|
| JP | 2001140870 A | 5/2001 |
| WO | 2011/105919 A1 | 9/2011 |

\* cited by examiner

ROLLING BEARING

CROSS-REFERENCE TO RELATED APPLICATIONS

This is a continuation under 35 U.S.C. § 120 of International Application PCT/PL2018/000067, filed Jul. 4, 2018, which claims priority to Polish application P.423481 filed Nov. 16, 2017, the contents of each of which are incorporated by reference herein.

FIELD OF THE INVENTION

The invention relates to a rolling bearing, wherein rolling elements having the form of balls are moving between two bearing races.

BACKGROUND

Rolling bearings used as structural components of machine parts are known. Designs of rolling bearings are diversified—however, in every case, they contain rolling elements, moving between two bearing races. Additional components of a rolling bearing may include: separators (cages) maintaining the rolling elements in a constant mutual distance, sealing elements etc.

Rolling bearings provide a rotary motion of a shaft and maintaining a constant position of its rotation axis, also, they transmit loads, so they should be characterised by low resistance to motion, stable operation, reliability of operation, and wear resistance, or high durability. To obtain the lowest possible energy losses due to friction and reduction of noise resulting from vibrations of mating components, the bearing races of structural components which mate with the rolling elements are ground, and then superfinished. However, small differences of dimensions of the rolling elements cause an important problem. The mass-produced rolling elements are classified in regard to their sizes, but achieving an absolute dimensional uniformity of the rolling elements is impossible in practice. For example, balls with diameters differing by up to 2 µm are inserted into a ball bearing. In a so-assembled bearing, which rotates e.g. with a rate of 1000 rpm, the individual balls moving on the races may cover distances differing by even 20 mm during 1 minute of operation. Unequal loads of the rolling elements of the bearing causes further differences in the distance covered by a rolling element. In the rolling bearings transmitting only transverse loads, the rolling elements which do not transmit any load are moving, which equalises the distance covered. In the bearings, where all rolling elements are loaded, the equalisation of the distance covered by the rolling elements takes place due to a spin of the rolling element in relation to the bearing races. For the spin to occur, the forces of a ball acting onto a cage or a neighbouring ball must increase to values exceeding the sliding friction forces. The higher the load of the bearing, the higher the sliding friction forces. In such a case, a grease used for greasing of rolling bearings is a necessary factor which ensures a correct mating. Lack of a proper greasing is the main factor of the bearing's wear. Rolling bearings transmitting only transverse loads, having cages made of materials with a low friction coefficient, may work without greasing.

The description of an international Patent Application No. WO2011105919 discloses a bearing consisting of two rings equipped with bearing races, on which loaded rolling elements travel, wherein at least one groove or recess positioned transversely towards the movement direction of the rolling elements is situated on one of the bearing races. The transverse groove or recess allow the rolling element for a momentary unmating with one of the bearing races, and moving, under the influence of the cage force or a neighbouring rolling element force, due to different diameters of the rolling elements and unequal load of the rolling elements of the bearing. A lack of the slide between the rolling element and the races, resulting from the use of a bearing according to the invention with a transverse unfilled groove or recess, enables operation of the bearing without greasing.

Bearings with grooves, particularly transverse grooves, or with indentations or recesses in the bearing races, are also presented in the following patent descriptions: EP375938, US20080285903, U.S. Pat. No. 1,334,027, JPH07197937.

SUMMARY

A rolling bearing, wherein the rolling elements are loaded, equipped with a cage separating the rolling elements, wherein at least one groove is situated on the bearing race on which the rolling elements travel, according to the invention is characterised in that edges of the groove are positioned at an angle $\alpha$ from 4.5° to 80° in relation to the movement direction of the rolling elements. In the cage, the holes for the rolling elements are made askew so that the angle $\beta$ between a straight line connecting the cage centre with the centre of the hole for the rolling element and a radially extending tangent to the rolling element at the contact point of this element with one of the walls of the hole of the cage which delimits the length of the hole in the circumferential direction has a value $\beta > \mathrm{arc\,tg}\,\mu$, where $\mu$ is the sliding friction coefficient of mating of the rolling element material with the cage material.

For the bearings rotating in one specific direction, radially extending tangents to the rolling element at the contact point of this element with one of the walls of the hole of the cage which delimits the length of the hole in the circumferential direction are parallel. For the bearings rotating in both directions, the tangents are convergent.

Preferably, the groove is positioned so as to the rolling element would move towards the greater diameter of the bearing race.

Preferably, one of the bearing races has a shape of a sector of a spherical cap with a radius based on the axis of the bearing.

In the bearing according to the invention, groove positioned obliquely in relation to the movement of the rolling elements on one of the bearing races allows the rolling element for a momentary unmating off the races and shifting—because of the taper of the groove—towards the larger or smaller diameter of the bearing race. Due to this fact, the forces exerted by the bearing race onto the rolling element while leaving the groove decrease. The lack of forces exerted by the bearing race onto the rolling element provides a possibility to eliminate forces between the rolling element and the cage, resulting from the difference of distances covered by the rolling elements. It is preferable for the shift to occur towards the greater diameter of the bearing race, which facilitates leaving the groove for the rolling element. Then, an increase in the durability of the bearing by approx. 20% is obtained.

The skew positioning of the groove, in comparison to a transverse groove, decreases the forces exerted by the bearing race onto the rolling element significantly. The movement resisting torque of a bearing with a transverse groove is approximately two times higher than a bearing with a skew groove.

In turn, the forces emerging between the rolling elements and the cage with tapered surfaces of the holes for the rolling elements, cause a reduction of forces exerted by the cage onto the ring of the bearing guiding the cage, which decreases the movement resisting torque of the bearing significantly. With a rotating internal ring, the cage speed is slower than the internal ring speed. Contacting with the internal race of the bearing, the cage separating the rolling elements, undergoes an acceleration and presses the rolling element. Then, the rolling element contacts with the rear part of the cage hole. Depending on the angle between the direction of action of the force exerted by the cage onto the rolling element and the tangent to the rolling element in the point of contact of the rolling element with the cage, the distribution of forces may be favourable or unfavourable for the bearing's operation. Two forces occur: the first one moving the cage away from the internal ring, and the second one being the force of sliding friction between the cage and the rolling element, pressing the cage to the internal ring. If the force moving the cage away from the internal ring is larger than the force of friction between the rolling element and the cage, then the distribution of forces is favourable for the bearing's operation. This situation occurs when the condition of $\beta$>arc tg $\mu$ is met, where $\mu$ is the sliding friction coefficient of mating of the rolling element material and the cage material, and $\beta$ is the angle between a straight line connecting the cage centre with the centre of the cage hole for the rolling element and a tangent to the rolling element in the contact point of this element with the cage, or the cage taper.

A bearing according to the invention has a movement resisting torque of the bearing from four to ten times lower than a bearing with a transverse groove and a greased bearing. The bearing according to the invention offers a possibility to operate without greasing, while maintaining a durability comparable with bearings greased with oil, liquid lubricant or grease. Bearing arrangements using two rolling bearings according to the invention have been working for more than 20 thousand hours continuously and they have performed 2,500 million revolutions, under a longitudinal load of 50 N. Currently, the durability of known ungreased bearings loaded with a longitudinal force amounts to merely several million revolutions, and of those greased with Pb, $MoS_2$ type greases, under a longitudinal load of more than 50 N, does not exceed 60 million revolutions.

The constructional solution according to the invention offers significant effects in ordinary ball bearings, tapered ball bearings, magneto ball bearings, four-point ball bearings, ball bearings for spindles loaded with longitudinal and transverse forces.

BRIEF DESCRIPTION OF THE DRAWINGS

The subject of the invention is illustrated in the drawing, wherein.

DETAILED DESCRIPTION OF THE PREFERRED EMBODIMENTS

Figure 1:
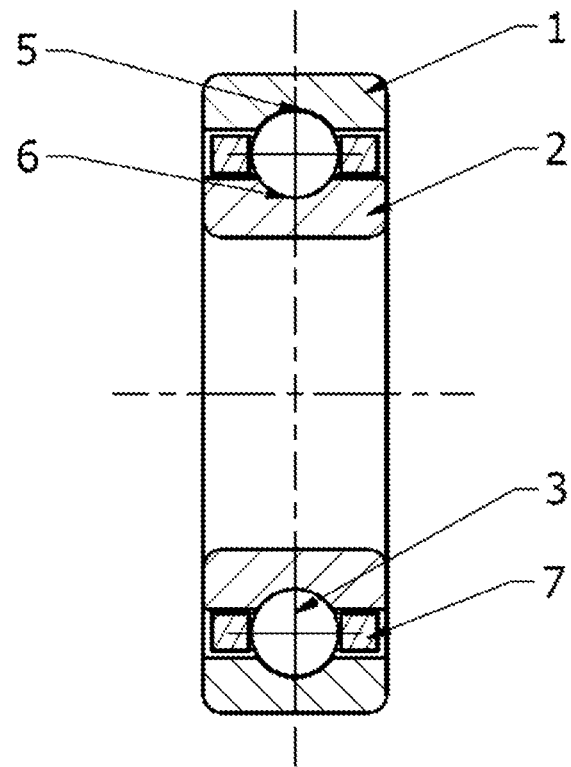
FIG. 1 shows a cross-section of an ordinary ball bearing with a cage.
Figure 2A:
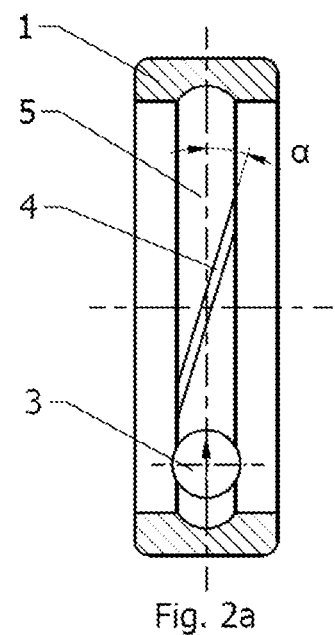
FIG. 2a and FIG. 2b show a cross-section of an embodiment of the groove in the right and left direction in relation to the movement direction of the rolling element on the bearing races.
Figure 2B:
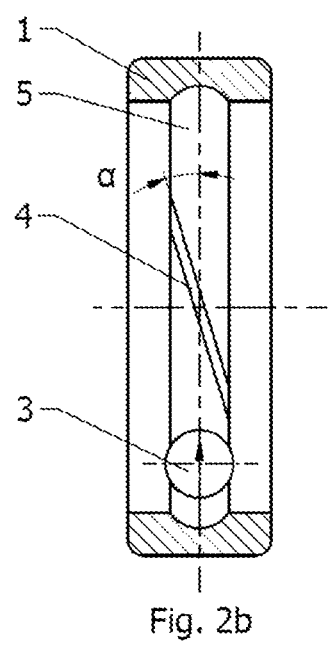
Figure 3A:
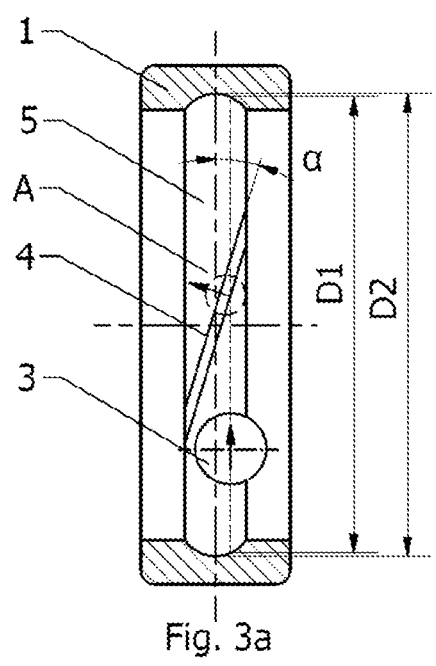
FIG. 3a and FIG. 3b show the shift of the rolling element towards the larger diameter.
Figure 3B:
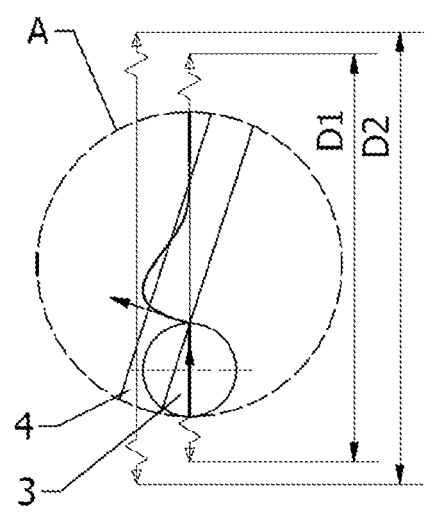

An embodiment of the bearing according to the invention shown in FIG. 1 is a single-row ball bearing. The bearing consists of an outer ring 1, an inner ring 2, rolling elements having the form of balls 3, and a cage 7. The rolling elements roll on an external bearing race 5 and an internal bearing race 6. A skew groove 4 is made in the internal bearing race 6. The groove 4 is situated askew in relation to the movement of the rolling elements 3, and the movement is marked with an arrow in FIG. 2a and FIG. 2b. While entering the groove 4 area, the rolling element 3 temporarily unmates off the races 5 and 6, and shifts, because of the taper of the groove 4, towards the larger diameter bearing races, from the diameter d1 to the diameter d2, as shown in FIG. 3a and FIG. 3b. It allows for gentle starting of the mating with both races 5 and 6 while the rolling element 3 is leaving the groove 4.

As shown in FIGS. 4a through 7b, the rolling elements 3 are placed in the cage 7 in holes made askew, and the taper inclination angle $\beta$ between a straight line $O_1O_2$ connecting the centre $O_1$ of the cage 7 with the centre $O_2$ of the hole for the rolling element 3, and a radially extending tangent 8 to the rolling element 3 at the contact point of this element with one of the walls of the hole of the cage 7 which delimits the length of the hole in the circumferential direction has a value $\beta$>arc tg $\mu$, where $\mu$ is the friction coefficient of mating of the rolling element material 3 with the cage 7.

Figure 4A:
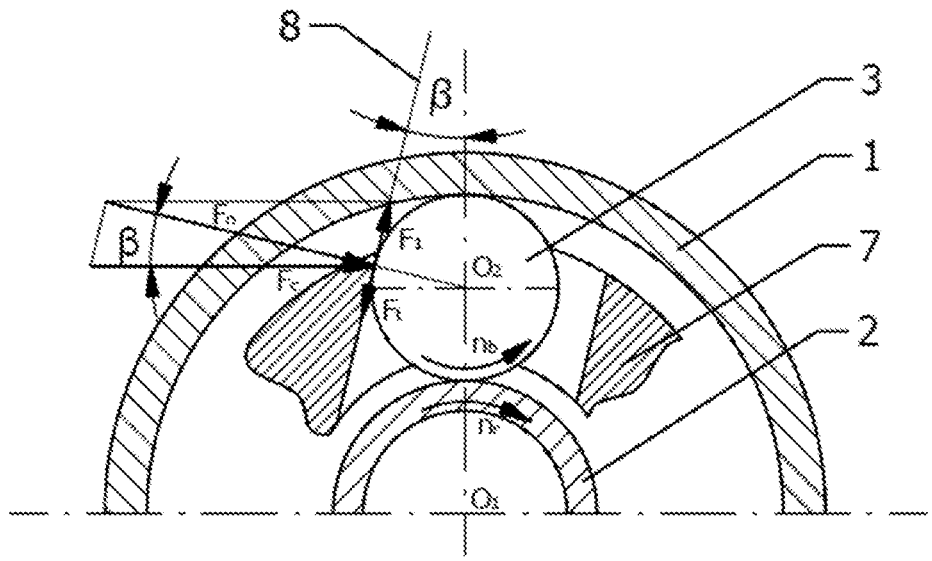
FIG. 4a, FIG. 4b, FIG. 5a, FIG. 5b, FIG. 6, FIG. 7a and FIG. 7b show a cage fragment and forces exerted by the cage onto the rolling elements.

As shown in FIG. 4a, at the cage 7 being guided on the internal ring 2 rotating with a rotational speed $n_r$, a force lifting the cage 7 upwards, Fl=Fs sin $\beta$, emerges at the point of contact between the cage 7 and the rolling element 3. The aim of this force is to reduce the impact of the cage 7 on the bearing's ring guiding the cage 7. This force must be larger than the force Ft=Fn $\mu$, being the force of friction between the rolling element 3 rotating with a rotational speed $n_b$ and the cage 7, in the point of contact of these elements, where Fn=Fe cos $\beta$; Fe is the force exerted by the cage 7 onto the rolling element 3; $\mu$ is the sliding friction coefficient of mating of the cage 7 material and the rolling element 3 material. A condition of $\beta$>arc tg $\mu$ results from these equations. In the case when the cage 7 jest is made of polyether etherketone (PEEK), and the rolling elements are made of 100Cr6 steel, the sliding friction coefficient between these materials amounts to $\mu$=0.4. Then, in accordance with the $\beta$>arc tg $\mu$ formula, the taper inclination angle of the cage should be $\beta$>22°.

Figure 4B:
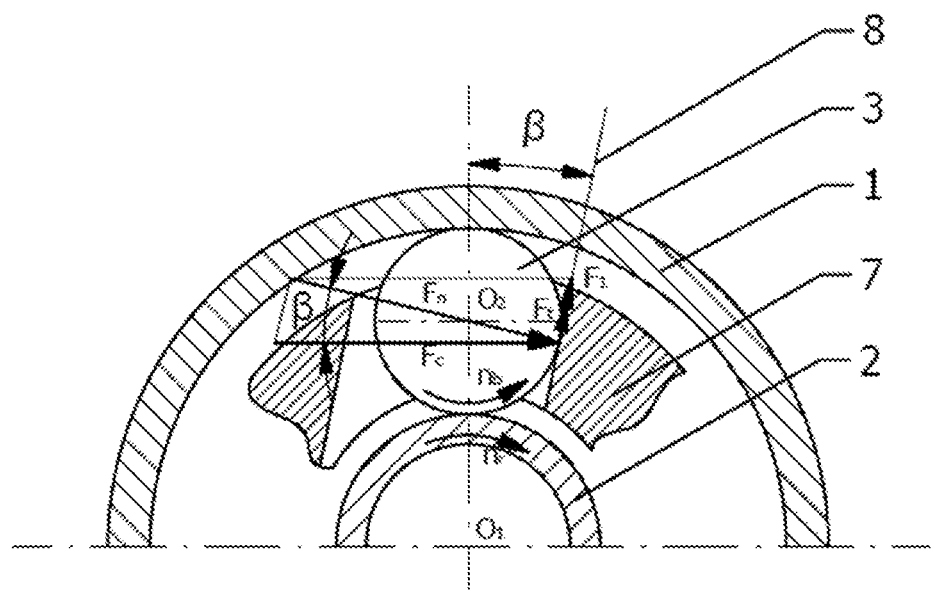

FIG. 4b shows a distribution of forces, when the instantaneous angular velocity of the cage 7 is faster than the angular velocity of the rolling element 3.

Figure 5A:
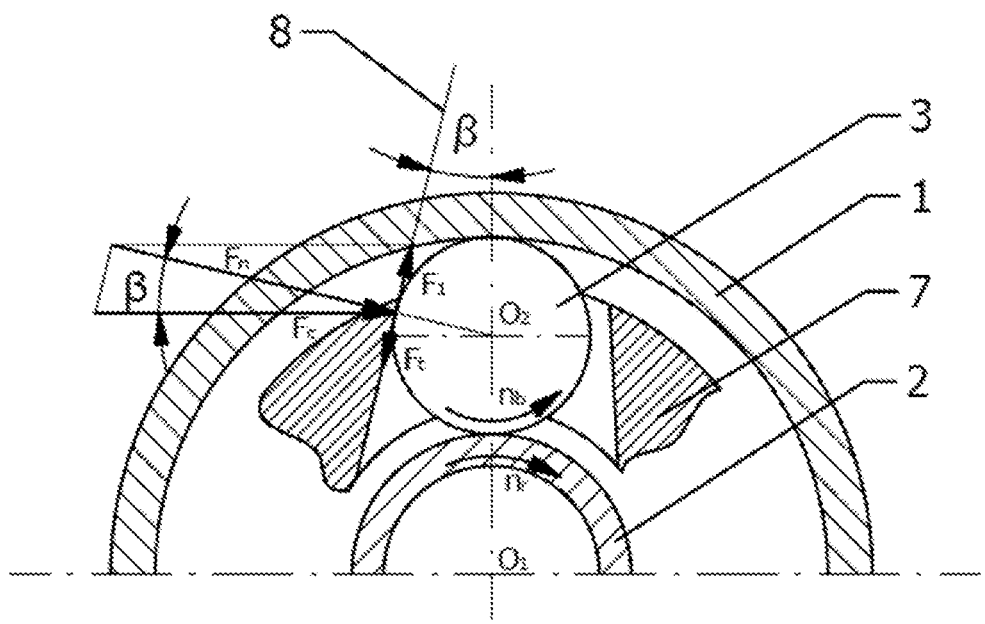
Figure 5B:
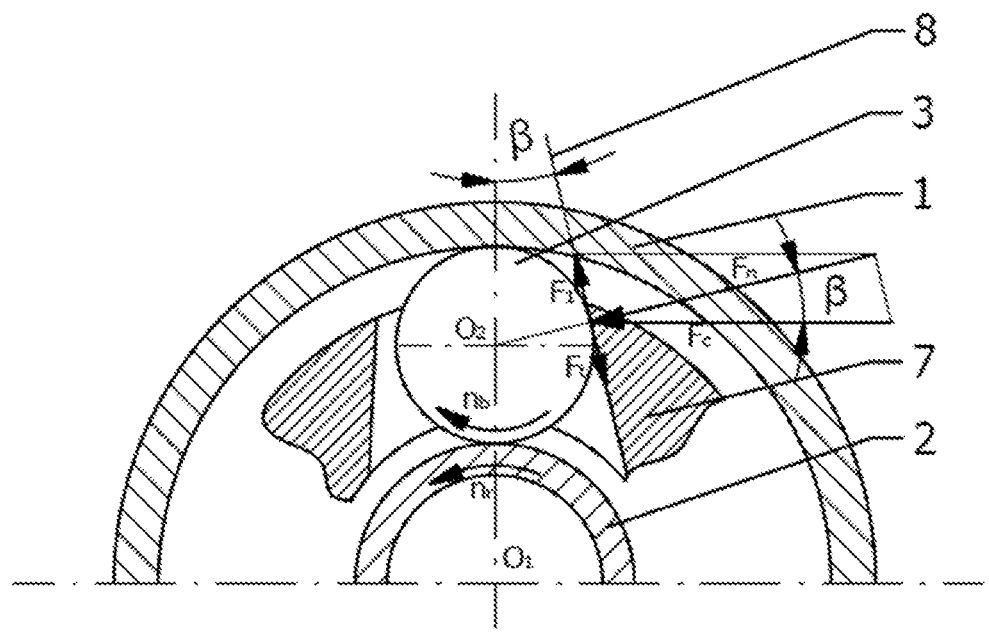

FIG. 5a and FIG. 5b show a distribution of forces between the cage 7 and the rolling element 3 in the case of rotation of the bearing's inner ring 2 in both directions.

Figure 6:
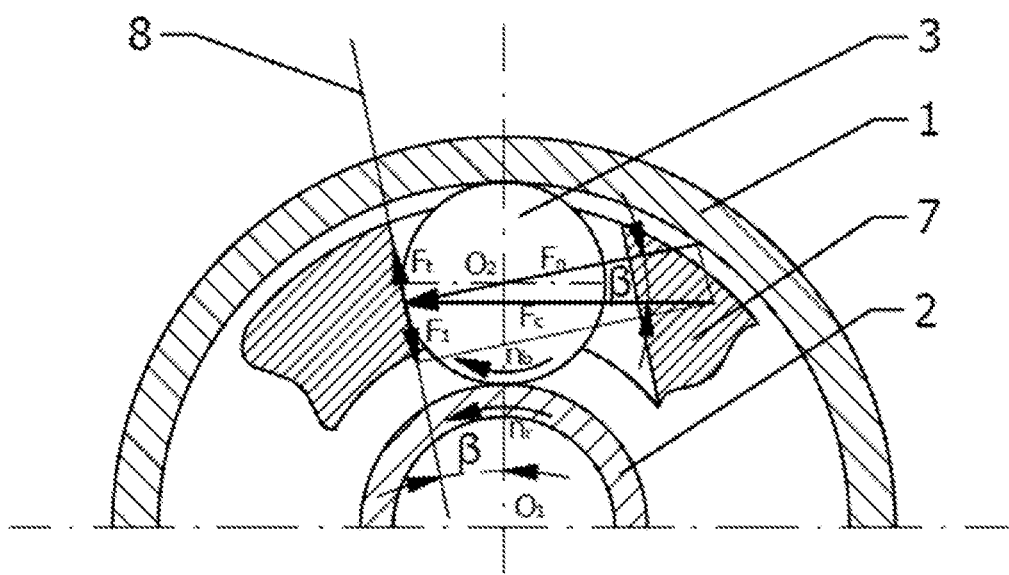

FIG. 6 shows a distribution of forces between the cage 7 and the rolling element 3 in the case of guiding of the cage 7 on the external ring 1, with the internal ring 2 rotating with a rotational speed $n_r$.

Figure 7A:
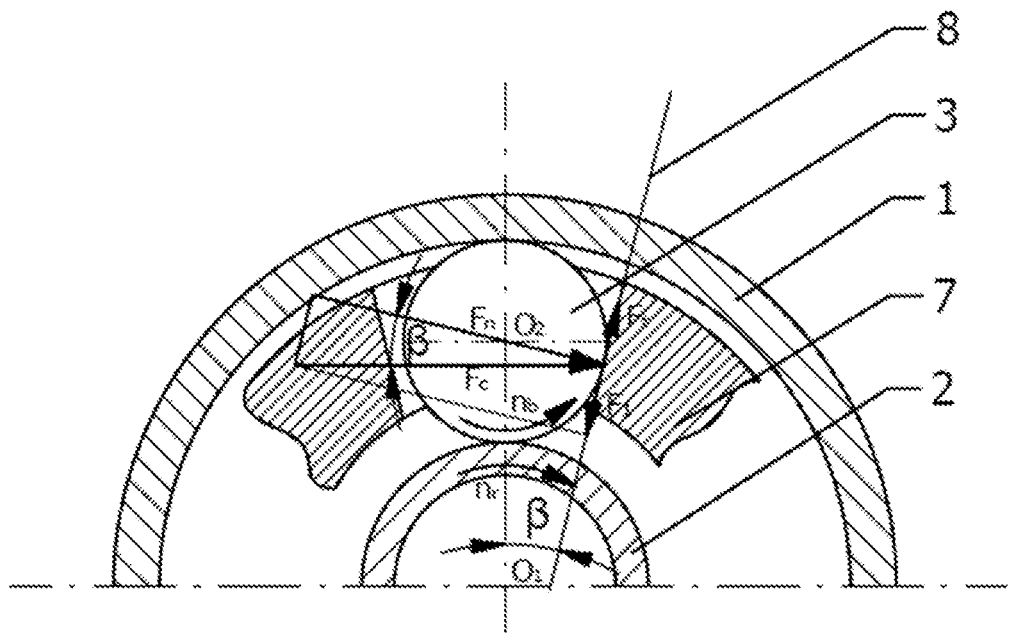
Figure 7B:
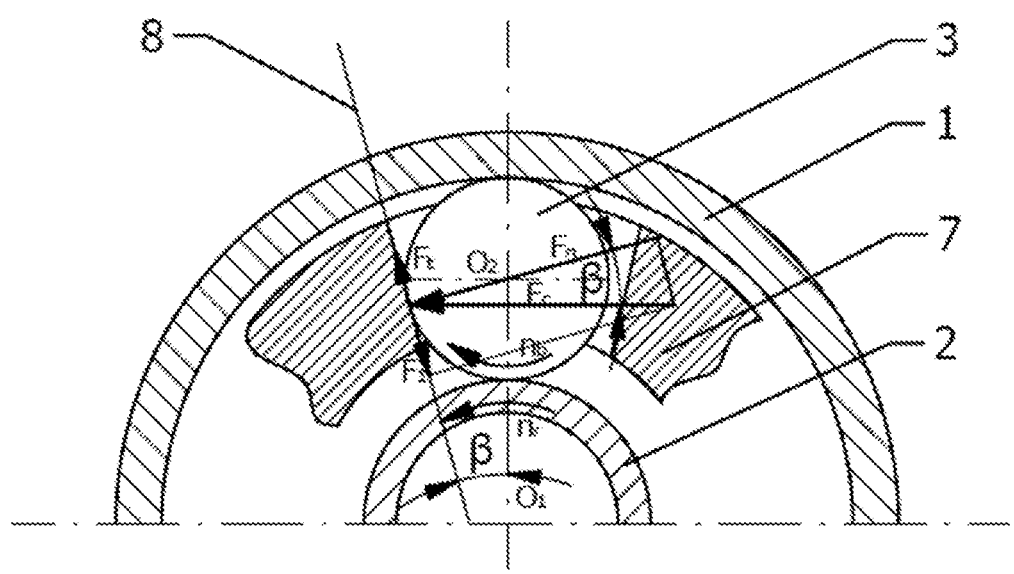

FIG. 7a and FIG. 7b show a distribution of forces between the cage 7 and the rolling element 3 in the case of guiding of the cage 7 on the external ring 1, with the internal ring 2 rotating in both directions with a rotational speed $n_r$.

Figure 8:
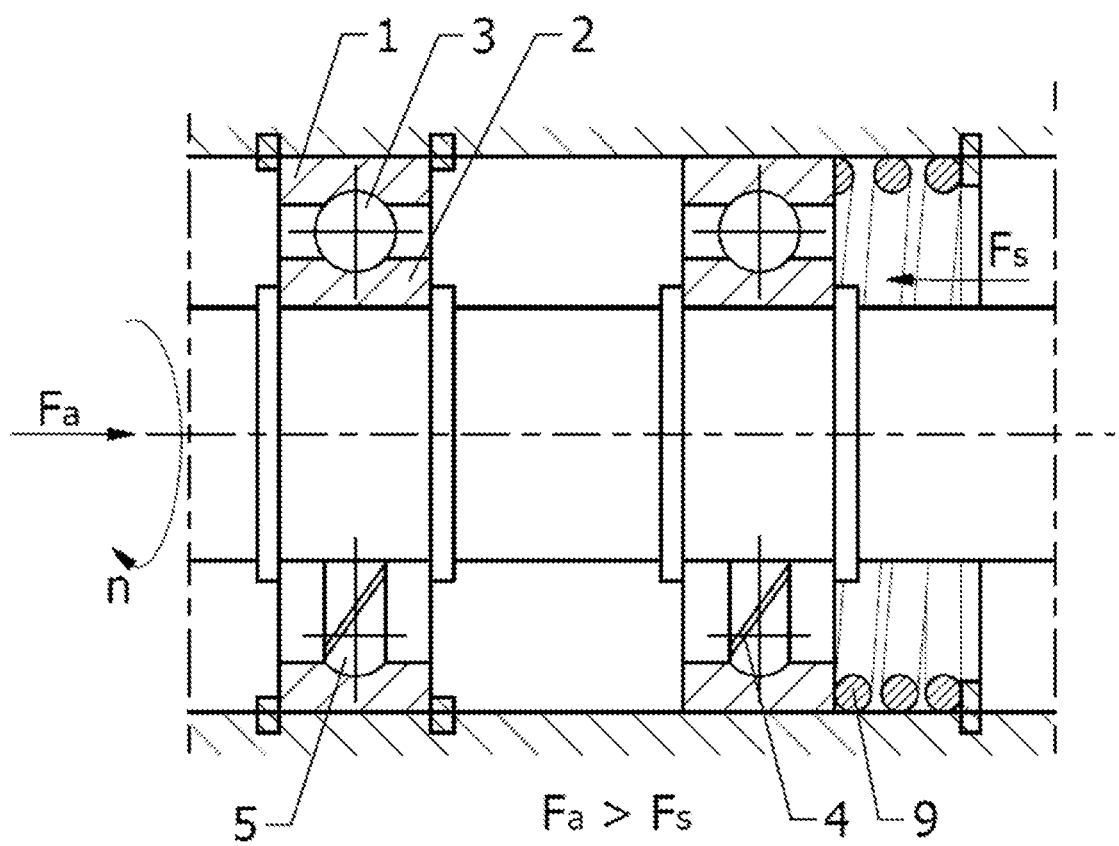
FIG. 8 shows an example of a bearing arrangement on two bearings with right grooves.

In FIG. 8, an example of a bearing arrangement on two bearings with right grooves 4 is shown. Directions of the grooves 4 in relation to the rolling elements 3 moving on the bearing race yield a more preferable distribution of forces between the rolling element 3 and the races while passing through groove 4. To obtain a preload of the bearings with the force Fs, a spring 9 is used. Fa is the external load of the bearing with the longitudinal force.

The invention claimed is:

1. A rolling bearing comprising rolling elements, wherein the rolling elements are loaded, equipped with a cage separating the rolling elements,
    wherein at least one groove is situated on a bearing race on which the rolling elements travel,
    wherein edges of the at least one groove (4) are positioned at an angle α from 4.5° to 80° in relation to the movement direction of the rolling elements (3), and
    in the cage (7), holes for the rolling elements are made askew so that an angle β between a straight line connecting a center of the cage O1 with a center O2 of the rolling element (3) and a radially extending tangent (8) to the rolling element (3) at a contact point of the rolling element with a wall of the hole of the cage which delimits a length of the hole in a circumferential direction has a value β>arc tg μ, where μ is the sliding friction coefficient of mating of the rolling element material (3) with the cage material (7).

2. A rolling bearing according to claim 1, wherein the groove (4) is positioned so that the rolling element would move towards a greater diameter of the bearing race.

3. A rolling bearing according to claim 1, wherein for the bearing rotating in one direction, radially extending tangents to the rolling element (3) at a contact point of the rolling element with a wall of the hole of the cage which delimits a length of the hole in the circumferential direction are parallel.

4. A rolling bearing according to claim 1, wherein for the bearing rotating in both directions, a radially extending tangent to the rolling element (3) at a contact point of the rolling element with a walls of the hole of the cage which delimits a length of the hole in the circumferential direction are convergent.

* * * * *